US008965755B2

(12) United States Patent
Koike et al.

(10) Patent No.: US 8,965,755 B2
(45) Date of Patent: Feb. 24, 2015

(54) ACOUSTIC DATA COMMUNICATION DEVICE

(75) Inventors: Yuji Koike, Yokohama (JP); Kazuhito Inoue, Tokyo (JP)

(73) Assignee: Yamaha Corporation (JP)

( * ) Notice: Subject to any disclaimer, the term of this patent is extended or adjusted under 35 U.S.C. 154(b) by 805 days.

(21) Appl. No.: 13/190,021

(22) Filed: Jul. 25, 2011

(65) Prior Publication Data

US 2012/0026838 A1 Feb. 2, 2012

(30) Foreign Application Priority Data

Jul. 27, 2010 (JP) ................................. 2010-168380

(51) Int. Cl.
| | |
|---|---|
| G01L 19/00 | (2006.01) |
| G10L 21/00 | (2013.01) |
| G10L 15/30 | (2013.01) |
| G10L 19/005 | (2013.01) |

(52) U.S. Cl.
CPC ................ G10L 21/00 (2013.01); *G10L 15/30* (2013.01); *G10L 19/005* (2013.01)
USPC ............................ 704/201; 704/270; 704/275

(58) Field of Classification Search
CPC ...... H04H 20/20; G10L 15/30; G10L 19/005; G10L 21/00
USPC ......................................... 704/201, 270, 275
See application file for complete search history.

(56) References Cited

U.S. PATENT DOCUMENTS

| | | | | |
|---|---|---|---|---|
| 5,579,770 | A * | 12/1996 | Finger | 600/447 |
| 6,028,542 | A * | 2/2000 | Fukui et al. | 341/123 |
| 2004/0006634 | A1* | 1/2004 | Ferris | 709/231 |
| 2006/0143018 | A1* | 6/2006 | Densham et al. | 704/500 |
| 2007/0250324 | A1* | 10/2007 | Nakanura et al. | 704/503 |
| 2009/0306992 | A1 | 12/2009 | Ragot et al. | |

FOREIGN PATENT DOCUMENTS

| | | |
|---|---|---|
| JP | 10-177380 A | 6/1998 |
| JP | 11-085148 A | 3/1999 |
| WO | 2007091206 A1 | 8/2007 |

OTHER PUBLICATIONS

European Search Report issued Oct. 17, 2011 for corresponding EP Patent Application No. 11175165.7.

* cited by examiner

*Primary Examiner* — Luke Ratcliffe
*Assistant Examiner* — Hovhannes Baghdasaryan
(74) *Attorney, Agent, or Firm* — Rossi, Kimms & McDowell LLP

(57) ABSTRACT

An audio data processing system is a client-server system including an audio data communication device and an audio data processing device which are linked together via a communication network. The audio data communication device includes an acoustic generator, a control device, a transmitter and a receiver in connection with first and second storage areas. The transmitter sequentially transmits a time series of unprocessed data DA[n] stored in the first storage area, while the receiver sequentially receives a time series of processing-completed data DB[n] from the acoustic data processing device so that processing-completed data are stored in the second storage area and sequentially reproduced. When specific processing-completed data is not stored in the second storage area, the control device designates and reproduces specific unprocessed data, which is unprocessed acoustic data corresponding to specific processing-completed data. Alternatively, the control device designates and reproduces cross-faded acoustic data, combining unprocessed data and processing-completed data.

7 Claims, 7 Drawing Sheets

ACOUSTIC DATA COMMUNICATION DEVICE

BACKGROUND OF THE INVENTION

1. Field of the Invention

The present invention generally relates to acoustic data processing systems including clients sending acoustic data and servers implementing acoustic processing, and in particular to acoustic data communication devices which communicate with acoustic data processing devices so as to receive processed acoustic data for utilization in specific needs.

The present application claims priority on Japanese Patent Application No. 2010-168380, the entire content of which is incorporated herein by reference.

2. Description of the Related Art

Conventional technologies regarding acoustic data processing systems including clients and servers have been developed and disclosed in various documents (e.g. Patent Documents 1, 2), wherein servers act as acoustic data processing devices so as to perform acoustic processing (e.g. sound-effect processing) on acoustic data received from clients (e.g. acoustic data communication devices) via communication lines. After completion of acoustic processing, acoustic data processing devices send back processing-completed data to acoustic data communication devices. Acoustic data communication devices sequentially reproduce processing-completed data received from acoustic data processing devices.

Patent Document 1: Japanese Patent Application Publication No. H10-177380

Patent Document 2: Japanese Patent Application Publication No. H11-85148

Acoustic data communication devices need to cope with fluctuations of time periods occurring between the transmission timing for transmitting unprocessed data and the reception timing for receiving processing-completed data since these time periods are randomly varied due to various factors such as communication traffic of communication networks and processing loads of acoustic data processing devices. This occasionally causes the situation in which acoustic data communication devices have not yet received processing-completed data from an acoustic data processing device at the reproduction timing for reproducing processing-completed data. When processing-completed data are delayed, acoustic data communication devices suffer from a problem in that sound reproduction is likely to discontinue intermittently due to redundant times waiting for reception of processing-completed data.

SUMMARY OF THE INVENTION

It is an object of the present invention to provide an acoustic data communication device which is able to prevent sound reproduction from being intermittently discontinued due to communication delays of processing-completed data.

The present invention generally relates to an audio data processing system, i.e. a client-server system including an audio data communication device and an audio data processing device which are linked together via a communication network.

The acoustic data communication device includes a first storage area that stores a time series of unprocessed data representing original acoustic data prior to acoustic processing; a transmitter that sequentially transmits the time series of unprocessed data to the acoustic data processing device; a receiver that sequentially receives a time series of processing-completed data from the acoustic data processing device in correspondence with the time series of unprocessed data which are subjected to acoustic processing; a second storage area that stores the time series of processing-completed data received by the receiver; an acoustic data designation unit that sequentially designates the time series of processing-completed data stored in the second storage area, wherein when specific processing-completed data is not stored in the second storage area at the timing of designating the specific processing-completed data, the acoustic data designation unit designates specific unprocessed data stored in the first storage area, which is unprocessed acoustic data corresponding to the specific processing-completed data, instead of the specific processing-completed data; and a reproduction processor that sequentially reproduces acoustic data designated by the acoustic data designation unit.

In the above, specific unprocessed data is designated instead of specific processing-completed data which is not stored in the second storage area due to delay. Compared to the foregoing constitution in which non-sound data (or zero data) is designated instead of delayed processing-completed data, it is possible to prevent reproduced sound from being intermittently discontinued even when processing-completed data are delayed in communication.

Additionally, the acoustic data communication device further comprises an instruction generator that periodically generates processing instructions, each of which designates previous unprocessed data which is a reference delay prior to current unprocessed data, so that the acoustic data designation unit designates previous processing-completed data corresponding to previous unprocessed data designated by each processing instruction. This secures sequential reproduction of processing-completed data even when processing-completed data is delayed within the reference delay, thus reducing the unwanted situation in which unprocessed data are frequently designated instead of processing-completed data for use in the reproduction processor.

Furthermore, the control device adopts two cross-fading procedures for producing cross-faded acoustic data as follows.

The first cross-fading procedure is initiated when at the timing of designating processing-completed data (e.g. DB[2] in FIG. 6), the designated processing-completed data is stored in the second storage area whilst its next processing-completed data (e.g. DB[3]) following the designated processing-completed data is not stored in the second storage area, wherein the acoustic data designation unit produces and designates first cross-faded acoustic data (e.g. DC[2]), in which the designated processing-completed data sequentially decreases in level whilst unprocessed data corresponding to the designated processing-completed data sequentially increases in level, for use in the reproduction processor. Since first cross-faded acoustic data is inserted and reproduced prior to next unprocessed data (e.g. DA[3]), it is possible to reliably prevent the listener (or user) from sensing a boundary of acoustics in reproduced sound due to an acoustic transition from processed sound to original sound, thus demonstrating an acoustically natural impression of reproduction.

The second cross-fading procedure is initiated when at the timing of designating processing-completed data (e.g. DB[5] in FIG. 6), the designated processing-completed data is stored in the second storage area whilst its preceding processing-completed data (e.g. DB[4]) preceding the designated processing-completed data is not stored in the second storage area, wherein the acoustic data designation unit produces and designates second cross-faded acoustic data (e.g. DC[5]), in which the designated processing-completed data sequentially increases in level whilst unprocessed data corresponding to the designated processing-completed data sequentially decreases in level, for use in the reproduction processor. Since second cross-faded acoustic data is inserted and reproduced following preceding unprocessed data (e.g. DA[4]), it is possible to reliably prevent the listener (or user) from sensing a boundary of acoustics in reproduced sound due to an acoustic transition from original sound to processed sound, thus demonstrating an acoustically natural impression of reproduction.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENTS

The present invention will be described in further detail by way of examples with reference to the accompanying drawings.

1. First Embodiment

Figure 1:
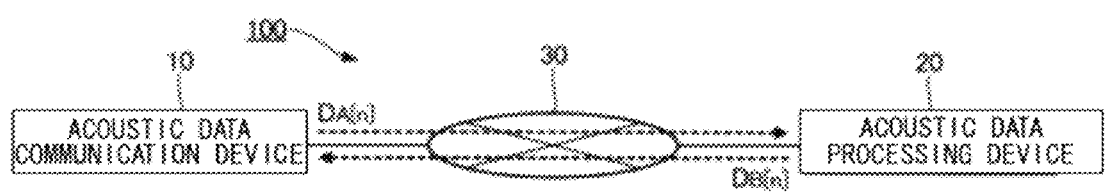
FIG. 1 is a block diagram of an acoustic data processing system according to a first embodiment of the present invention.

FIG. 1 is a block diagram of an acoustic data processing system 100 according to a first embodiment of the present invention. The acoustic data processing system 100 of FIG. 1 is a communication system including a client (e.g. an acoustic data communication device 10) and a server (e.g. an acoustic data processing device 20). The acoustic data communication device 10 mutually communicates with the acoustic data processing device 20 via a communication network 30 (e.g. the Internet). For the sake of convenience, FIG. 1 shows a single acoustic data communication device 10, whereas, in actuality, a plurality of acoustic data communication devices 10 is connected in parallel so that each acoustic data communication device 10 is able to communicate with the acoustic data processing device 20 via the communication network 30.

The acoustic data processing system 100 implements communication procedures which are outlined as follows.

The acoustic data communication device 10 sequentially transmits unprocessed data DA[n] (where n=1, 2, . . . ), representing waveforms of acoustic data (e.g. music, sound, speech) on the time axis, to the acoustic data processing device 20. The acoustic data processing device 20 performs acoustic processing on unprocessed data DA[n], received from the acoustic data communication device 10, so as to sequentially send back processing-completed data DB[n], which are equivalent to unprocessed data DA[n] subjected to acoustic processing, to the acoustic data communication device 10. As acoustic processing implemented by the acoustic data processing device 20, it is possible to designate processing for varying acoustic frequency characteristics of unprocessed data DA[n], for example, processing for imparting sound effect or reverberant sound and processing for converting frequency.

Figure 2:
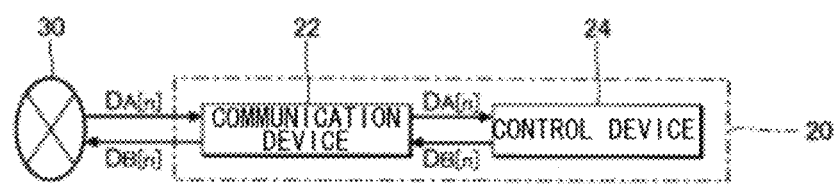
FIG. 2 is a block diagram of an acoustic data processing device.

FIG. 2 is a block diagram of the acoustic data processing device 20. The acoustic data processing device 20 of FIG. 2 includes a communication device 22 and a control device (e.g. a CPU) 24. The communication device 22 sequentially receives unprocessed data DA[n] from the acoustic data communication device 10 via the communication network 30. Subsequently, the communication device 22 sequentially sends back processing-completed data DB[n], which are equivalent to unprocessed data DA[n] subjected to acoustic processing, towards the communication network 30. For instance, packets are each formed to contain a plurality of unprocessed data DA[n] or processing-completed data DB[n] (e.g. twenty data) with the predetermined length (e.g. a data length of about 500 ms of acoustics) and transferred between the acoustic data communication device 10 and the acoustic data processing device 20.

The control device 24 performs acoustic processing on unprocessed data DA[n], received by the communication device 22, so as to sequentially produce processing-completed data DB[n]. For instance, acoustic processing for unprocessed data DA[n] is realized by VST (Virtual Studio Technology) plug-in (where "VST" is a registered trademark). Processing-completed data DB[n] produced by the control device 24 are sequentially transmitted from the communication device 22 to the acoustic data communication device 10.

Figure 3:
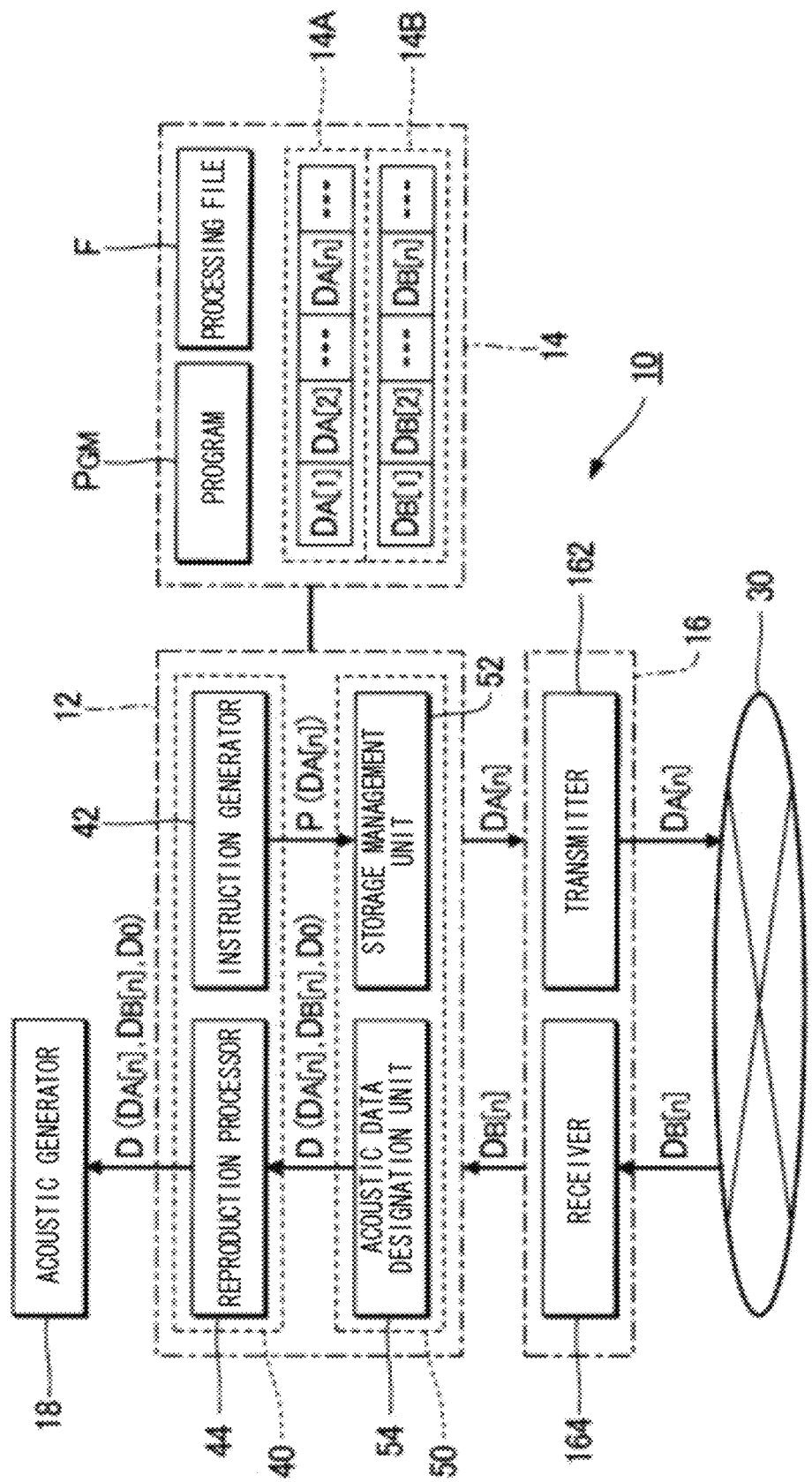
FIG. 3 is a block diagram of an acoustic data communication device.

FIG. 3 is a block diagram of the acoustic data communication device 10, which is a communication terminal such as a cellular phone and a personal computer. The acoustic data communication device 10 includes a control device (e.g. a CPU) 12, a storage device 14, a communication device 16, and a sound device (or an acoustic generator) 18.

The storage device 14 is configured of a semiconductor storage device or a magnetic storage device, which stores programs PGM executed by the control device 12 and various data (e.g. processing files F) utilized by the control device 12. Processing files F are data files which are subjected to acoustic processing in the acoustic data processing device 20. Waveform data, representing time-related waveforms regarding a singing voice and instrumental sound of music, are stored in the storage device 14 as processing files F, wherein processing files F are divided into a plurality of segments equivalent to a plurality of waveform data, which are transmitted to the acoustic data processing device 20 as unprocessed data DA[n].

The storage device 14 includes two storage areas 14A, 14B, which serve as buffer areas according to the FIFO (First-In-First-Out) method. The storage area 14A sequentially inputs and stores unprocessed data DA[n] corresponding to divided segments of processing files F, whilst the storage area 14B sequentially inputs and stores processing-completed data DB[n] received from the acoustic data processing device 20.

The communication device 16 is a device for communicating with the acoustic data processing device 20 via the communication network 30 and includes a transmitter 162 and a receiver 164. The transmitter 162 sequentially transmits unprocessed data DA[n], stored in the storage area 14A, toward the communication network 30. The receiver 164 sequentially receives processing-completed data DB[n] from the acoustic data processing device 20 via the communication network 30.

The control device 12 implements multiple functions (e.g. functions of a management control device 40 and an information relay device 50) by executing programs PGM stored in the storage device 14. The management control device 40 acts as a DAW (Digital Audio Workstation) system for controlling the entire operation of the acoustic data communication device 10. The information relay device 50 implements its function by executing a VST plug-in using a VST host of the management control device 40, for example, thus relaying acoustic data D (i.e. unprocessed data DA[n] and processing-completed data DB[n]) transferred between the management control device 40 of the acoustic data communication device 10 and the acoustic data processing device 20.

The management control device 40 includes an instruction generator 42 and a reproduction processor 44. The instruction generator 42 sequentially generates processing instructions P destined to the information relay device 50. Processing instructions P are instructions for requesting the storage unit 14A to store unprocessed data DA[n], for transmitting unprocessed data DA[n] to the acoustic data processing device 20, and for requesting the acoustic data processing device 20 to send back processing-completed data DB[n]. For instance, processing instructions P are defined by ProcessReplacing functions implemented in the VST plug-in achieving the function of the information relay device 50. Processing instructions P are sequentially generated in periods T0, each of which is set to a time duration corresponding to a single unprocessed data DA[n] or a single processing-completed data DB[n].

The reproduction processor 44 sequentially retrieves acoustic data D (i.e. unprocessed data DA[n] and processing-completed data DB[n]), which are designated by the information relay device 50, from the storage device 14 so as to supply them to the acoustic generator 18. The acoustic generator 18 (e.g. a speaker or a headphone set) emits sound waves in accordance with acoustic data D received from the reproduction processor 44. In this connection, it is possible to reconfigure the acoustic data communication device 10 such that the reproduction processor 44 performs predetermined processing on acoustic data D, retrieved from the storage device 14, so as to supply processed acoustic data D to the acoustic generator 18.

In FIG. 3, the information delay device 50 includes a storage management unit 52 and an acoustic data designation unit 54. The storage management unit 52 manages the storage device 14 such that unprocessed data DA[n] and processing-completed data DB[n] (corresponding to unprocessed data DA[n] subjected to acoustic processing) are mutually correlated to each other. Specifically, the storage management unit 52 manages the storage device 14 such that unprocessed data DA[n], designated by a processing instruction P, are stored in the storage area 14A; unprocessed data DA[n] of the storage area 14A are sequentially transmitted to the acoustic data processing device 20 via the transmitter 162; then, processing-completed data DB[n] from the acoustic data processing device 20, received by the receiver 164, are sequentially stored in the storage area 14B.

The acoustic data designation unit 54 sequentially designates acoustic data D subjected to processing/reproduction (e.g. unprocessed data DA[n], processing-completed data DB[n]) and instructs the reproduction processor 44 to reproduce them. Every time the instruction generator 42 issues a processing instruction P, the acoustic data designation unit 54 designates acoustic data D. Therefore, the acoustic data designation unit 54 sequentially designates acoustic data D for use in the reproduction processor 44 in periods T0 equivalent to periods for issuing processing instructions P. The details regarding the operation of the acoustic data designation unit 54 designating acoustic data D will be described below.

A considerable time period is needed between the timing of transmitting unprocessed data DA[n] to the acoustic data processing device 20 to the timing of storing processing-completed data DB[n] (corresponding to unprocessed data DA[n] subjected to acoustic processing) in the storage area 14B. Among a plurality of processing-completed data DB[n] stored in the storage area 14B, the acoustic data designation unit 54 designates previous processing-completed data DB[n−τ], which corresponds to previous unprocessed data DA[n−τ] that occur a predetermined time length (hereinafter, referred to as "reference delay") τ before unprocessed data DA[n] designated by the processing instruction P, for use in the reproduction processor 44. The reference delay τ is determined based on the average time elapsed between the transmission timing of transmitting unprocessed data DA[n] and the reception timing of receiving and storing processing-completed data DB[n] in the storage area 14B, wherein the reference delay τ is set to a longer time length than the period T0 for issuing the processing instruction P.

The time period between the transmission timing of unprocessed data DA[n] and the reception timing of processing-completed data DB[n] is randomly varied due to various factors such as communication traffic of the communication network 30 and processing load of the acoustic data processing device 20. If a relatively long delay occurs between the transmission timing of unprocessed data DA[n] and the reception timing of processing-completed data DB[n], there is a possibility that previous processing-completed data DB[n−τ], which should be currently designated by the acoustic data designation unit 54, has not been stored in the storage area 14B at the timing of issuing the processing instruction P designating unprocessed data DA[m], in other words, there is a possibility that previous processing-completed data DB[n−τ] is delayed in communication. Considering this possibility, if previous processing-completed data DB[n−τ] is not stored in the storage area 14B at the timing of issuing the processing instruction P designating unprocessed data DA[n], the acoustic data designation unit 54 does not immediately designate previous processing-completed data DB[n−τ] but designates previous unprocessed data DA[n−τ], corresponding to previous processing-completed data DB[n−τ], in the storage area 14A for use in the reproduction processor 44.

Figure 4:
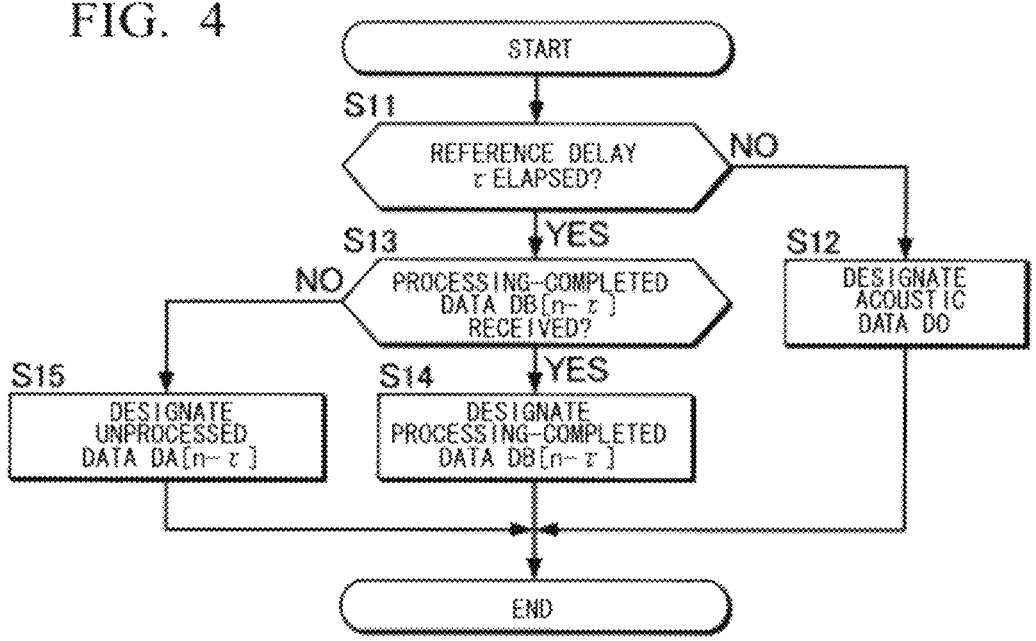
FIG. 4 is a flowchart illustrating the operation of an acoustic data designation unit.
Figure 5:
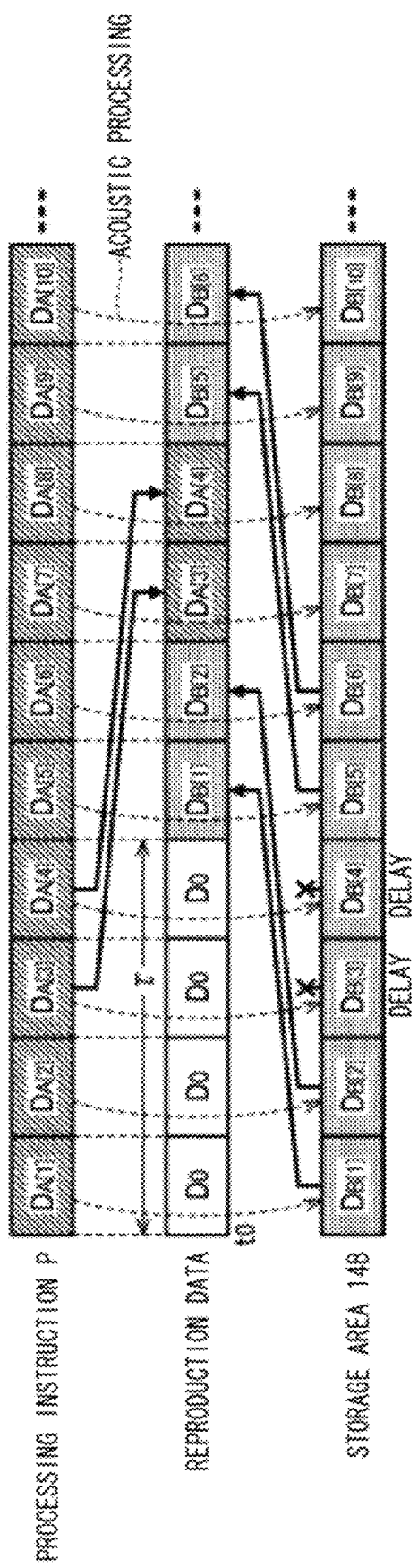
FIG. 5 is a schematic diagram of data configurations illustrating the operation of the acoustic data designation unit.

FIG. 4 is a flowchart illustrating the operation of the acoustic data designation unit 54, which is implemented every time the instruction generator 42 issues a processing instruction P. FIG. 5 is a schematic diagram illustrating the relationship between a time series of unprocessed data DA[n] sequentially designated with processing instructions P (see an upper data configuration), a time series of processing-completed data DB[n] stored in the storage area 14B (see a lower data configuration), and a time series of acoustic data D providing to the reproduction processor 44 (see an intermediate data configuration). In these exemplary illustrations, the reference delay τ is set to be four times longer than the period T0 of issuing each processing instruction P so that the reference delay τ embraces four unprocessed data DA[n] or four processing-completed data DB flit Upon initiating the process of FIG. 4, the acoustic data designation unit 54 makes a decision (step S11) as to whether or not the reference delay τ has been elapsed from time t0 at which the instruction generator 42 generates a first processing instruction P designating unprocessed data DA[1]. When the reference delay τ has not been elapsed (i.e. "NO" in step S11), the acoustic data designation unit 54 designates acoustic data D0 for use in the reproduction processor 44 in response to the first processing instruction P; then, it exits the process of FIG. 4 in step S12. Acoustic data D0 includes a time series of zero data indicating no sound. As shown in FIG. 5, the acoustic data designation unit 54 sequentially designates a plurality of acoustic data D0 until the reference delay τ has been elapsed from time t0, so that the acoustic generator 18 reproduces no sound (i.e. zero tone volume).

When the reference delay τ is elapsed from time t0 so that the decision result of step S11 turns to "YES", the acoustic data designation unit 54 makes a decision (step S13) as to whether or not previous processing-completed data DB[n−τ], corresponding to previous unprocessed data DA[n−τ] which occurred the reference delay τ before unprocessed data DA[n] designated by the current processing instruction P, has been stored in the storage area 14B. When the instruction generator 42 generates a fifth processing instruction P to designate unprocessed data DA[5], for example, the acoustic data designation unit 54 makes a decision as to whether or not processing-completed data DB[1], corresponding to unprocessed data DA[1] subjected to acoustic processing, has been stored in the storage area 14B.

When previous processing-completed data DB[n−τ] is stored in the storage area 14B so that the decision result of step S13 turns to "YES", the acoustic data designation unit 54 designates previous processing-completed data DB[n−τ], among processing-completed data stored in the storage area 14B, for use in the reproduction processor 44 in step S14. FIG. 5 shows that processing-completed data DA[1], DB[2] are designated in step S14. Thus, the user of the acoustic data communication device is able to listen to reproduced sound completed in acoustic processing with respect to unprocessed data DA[1], DA[2] in the processing file F. The similar operation will be repeated after processing-completed data DB[5].

When previous processing-completed data DB[n−τ] has not been stored in the storage area 14B so that the decision result of step S13 is "NO", the acoustic data designation unit 54 does not immediately designate previous processing-completed data DB[n−τ] but designates previous unprocessed data DA[n−τ], instead of previous processing-completed data DB[n−τ], in the storage area 14A for use in the reproduction processor 44 in step S15. FIG. 5 shows that, due to delays of processing-completed data DB[3], DB[4], the acoustic data designation unit 54 designates unprocessed data DA[3], DA[4] for use in the reproduction processor 44 in step S15. Thus, the user of the acoustic data communication device 10 is able to listen to reproduced sound corresponding to unprocessed data prior to acoustic processing stored in the processing file F.

According to the first embodiment, the acoustic data communication device 10 reproduces previous processing-completed data DB[n−τ] on condition that previous processing-completed data DA[n−τ] is stored in the storage area 14B without delay at the timing of issuing the processing instruction P, whilst the acoustic data communication device 10 reproduces previous unprocessed data DA[n−τ] instead of previous processing-completed data DB[n−τ] when previous processing-completed data DB[n−τ] is delayed in communication. Compared with the foregoing constitution in which the reproduction processor 44 is simply supplied with acoustic data D0 (i.e. zero data), indicating no reproduction sound, due to the lack of previous processing-completed data DB[n−τ], it is possible to prevent reproduced sound from being intermittently discontinued due to delay of processing-completed data DB[n].

2. Second Embodiment

In the first embodiment in which the reproduction processor 44 selectively designates either unprocessed data DA[n] or processing-completed data DB[n], acoustic characteristics of reproduced sound may be discontinuously varied at the boundary of acoustics between unprocessed data DA[n] and processing-completed data DB[n], or at the boundary of acoustics between original sound (prior to acoustic processing) and processed sound (after acoustic processing). This reproduction causes an artificial/affected impression of sound in an auditory sense. To solve this drawback, a second embodiment intermixes (using cross-fading) unprocessed sound DA[n] and processing-completed sound DB[n] so as to secure a continuous auditory transition between original sound (prior to audio processing) and processed sound (after acoustic processing). In the second embodiment, the constituent elements having the same operation and function as those used in the first embodiment are designated by the same reference numerals; hence, detailed descriptions thereof will be omitted as necessary.

Figure 6:
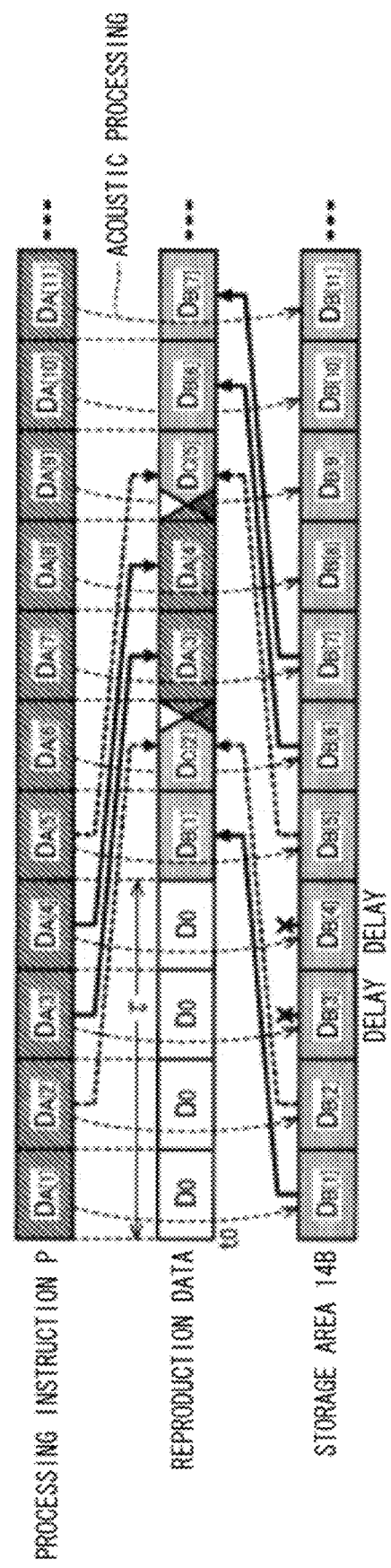
FIG. 6 is a schematic diagram of data configurations illustrating the operation of the acoustic data designation unit according to a second embodiment of the present invention.

FIG. 6 is a schematic diagram illustrating the operation of the second embodiment. Similar to the first embodiment shown in FIG. 5, FIG. 6 illustrates data configurations due to delays of processing-completed data DB[3], DB[4]. Similar to the first embodiment, the acoustic data designation unit 54 designates unprocessed data DA[3], instead of processing-completed data DB[3], and unprocessed data DA[4], instead of processing-completed data DB[4], for use in the reproduction processor 44.

Figure 7:
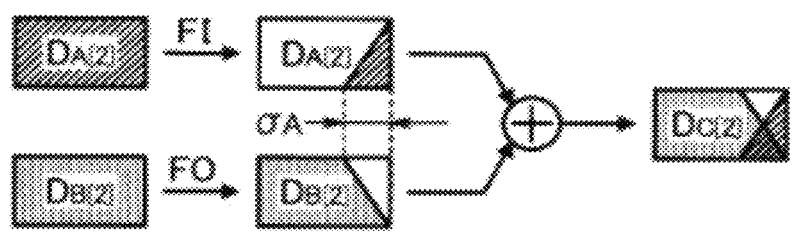
FIG. 7 is a schematic diagram illustrating cross-fading between unprocessed data and processing-completed data in their ending section.

In the situation in which the acoustic data communication device 10 of the second embodiment succeeds to receive processing-completed data DB[2] without delay but fails to receive processing-completed data DB[3] due to delay, the acoustic data designation unit 54 produces acoustic data DC[2] shown in FIG. 6 for use in the reproduction processor 44. As shown in FIG. 7, acoustic data DC[2] is produced by cross-fading unprocessed data DA[2] and processing-completed data DB[2]. Specifically, unprocessed data DA[2] is modified owing to fade-in (FI) so that its sound volume sequentially increases in an ending section σA (including an end point of each data), whilst processing-completed data DB[2] is modified owing to fade-out (FO) so that its sound volume sequentially decreases in the ending section A. The acoustic data designation unit 54 produces acoustic data DC[2] by adding modified unprocessed data DA[2] and modified processing-completed data DB[2] together.

As shown in FIG. 6, the acoustic data designation unit 54 designates acoustic data DC[2] preceding unprocessed data DA[3] for use in the reproduction processor 44. Thus, the acoustic generator 18 is able to secure an acoustically smooth transition of reproduced sound in the ending section σA such that processed sound of processing-completed data DB[2] is sequentially changed to original sound of unprocessed data DA[3] via modified sound of acoustic data DC[2]. This reliably prevents the listener (or user) from immediately sensing the boundary of acoustics between consecutive sounds, e.g. the boundary of acoustics between processing-completed data DB[2] and unprocessed data DA[3] in the first embodiment. In FIGS. 6 and 7, the ending section σA defines the time length between the intermediate point and the end point in unprocessed data DA[n] or processing-completed data DB[n]; but this is not a restriction. It is possible to adopt another configuration in which the ending section σA corresponds to the entire length of unprocessed data DA[n] or processing-completed data DB[n], in which unprocessed data DA[n] and processing-completed data DB[n] are subjected to cross-fading in their entire lengths.

Figure 8:
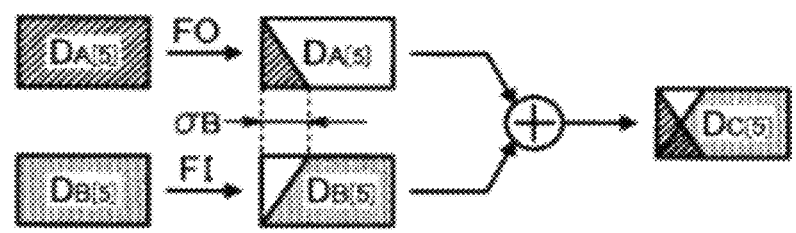
FIG. 8 is a schematic diagram illustrating cross-fading between unprocessed data and processing-completed data in their beginning section.

In another situation in which the acoustic data communication device 10 succeeds to receive processing-completed data DB[5] without delay but fails to receive preceding processing-completed data DB[4] due to delay, the acoustic data designation unit 54 produces acoustic data DC[5] shown in FIG. 6 for use in the reproduction processor 44. As shown in FIG. 8, acoustic data DC[5] is produced by cross-fading unprocessed data DA[5] and processing-completed data DB[5]. Specifically, unprocessed data DA[5] is modified such that its sound volume sequentially decreases owing to fade-out in a beginning section σB including a beginning point, whilst processing-completed data DB[5] is modified such that its sound volume sequentially increases owing to fade-in in the beginning section B. The acoustic data designation unit 54 produces acoustic data DC[5] by adding modified unprocessed data DA[5] and modified processing-completed data DB[5] together.

As shown in FIG. 6, the acoustic data designation unit 54 designates acoustic data DC[5] following unprocessed data DA[4] for use in the reproduction processor 44. Thus, the acoustic generator 18 is able to secure an acoustically smooth transition in the beginning section σB such that original sound of unprocessed data DA[4] is sequentially changed to processed sound of processing-completed data DB[5] via modified sound of acoustic data DC[5]. This reliably prevents the listener (or user) from sensing the boundary of acoustics between original sound and processed sound, e.g. the boundary of acoustics between unprocessed data DA[4] and processing-completed data DB[5]. In FIGS. 6 and 7, the ending section σB defines the time length between the intermediate point and the beginning point in unprocessed data DA[n] or processing-completed data DB[n]; but this is not a restriction. It is possible to adopt another configuration in which the beginning section oB corresponds to the entire length of unprocessed data DA[n] or processing-completed data DB[n], in which unprocessed data DA[n] and processing-completed data DB[n] are subjected to cross-fading in their entire lengths.

Figure 9:
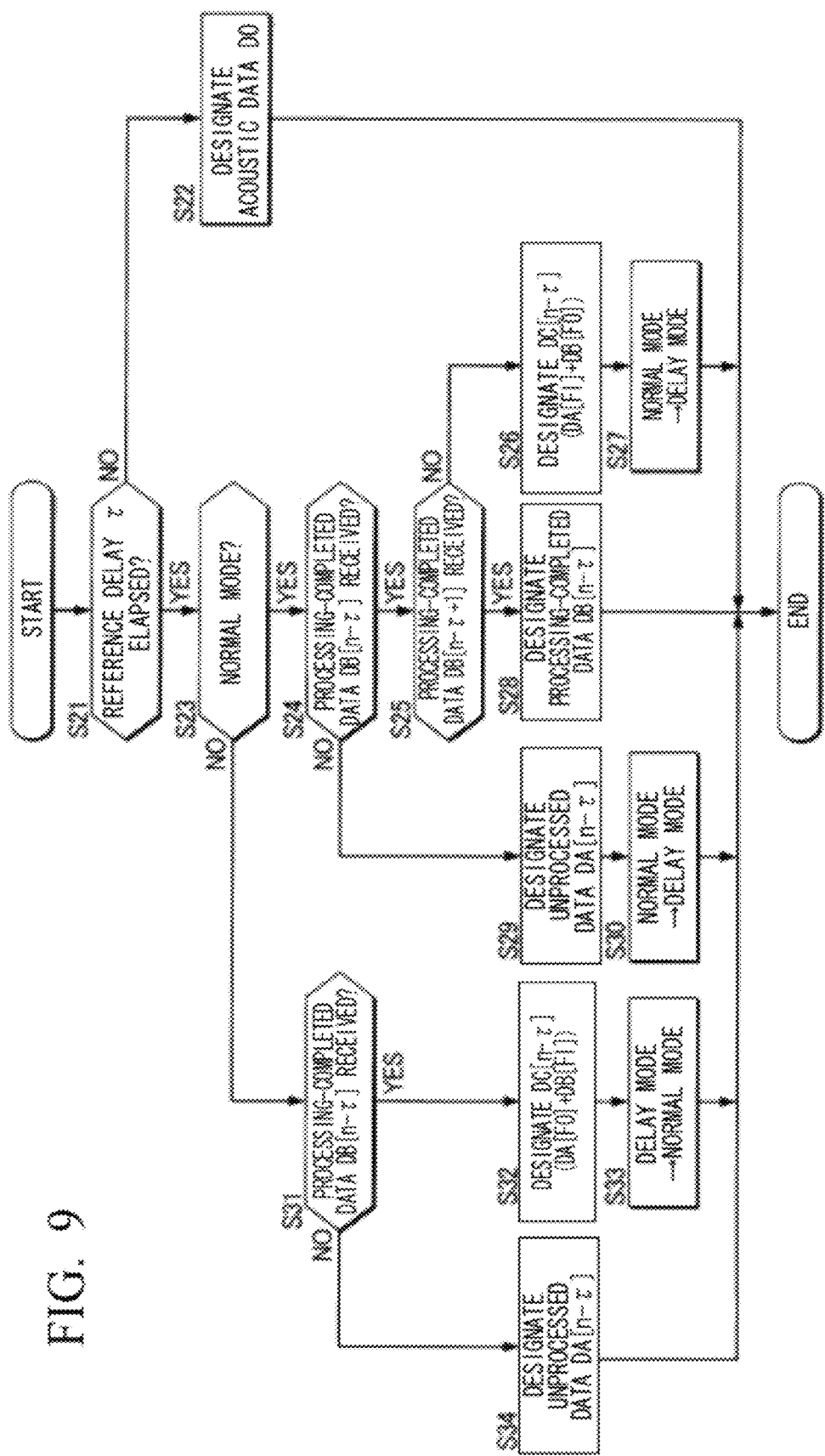
FIG. 9 is a flowchart illustrating the operation of the acoustic data designation unit according to the second embodiment.

Next, the detailed operation of the acoustic data designation unit 54 of the second embodiment will be described. The acoustic data designation unit 54 of the second embodiment adopts the process of FIG. 9, instead of the process of FIG. 4, which is executed every time a processing instruction P is issued. In the process of FIG. 9, the operation mode of the acoustic data designation unit 54 is set to either a normal mode or a delay mode. The normal mode refers to the operation mode in which processing-completed data DB[n] are sequentially received and stored in the storage area 14B without any delay. The delay mode refers to the operation mode in which processing-completed data DB[n] are delayed in communication. At the timing of issuing a first processing instruction P, the operation mode is initialized to the normal mode.

Similar to the first embodiment, the acoustic data designation unit 54 sequentially designates acoustic data D0 for use in the reproduction processor 44 until the reference delay τ is elapsed from time t0 at which the instruction generator 42 generates a first processing instruction P in steps S21, S22. When the reference delay τ is elapsed from time t0 so that the decision result of step S21 turns to "YES", the acoustic data designation unit 54 makes a decision as to whether or not the operation mode is currently set to the normal mode in step S23.

In the case of the normal mode (i.e. "YES" in step S23), the acoustic data designation unit 54 makes a decision as to whether or not previous processing-completed data DB[n−τ], which corresponds to previous unprocessed data DA[n−τ] that is the reference delay τ before current unprocessed data DA[n] designated by the current processing instruction P, is stored in the storage area 14B in step S24. When previous processing-completed data DB[n−τ] is stored in the storage area 14B (i.e. "YES" in step S24), the acoustic data designation unit 54 makes a decision as to whether or not processing-completed data DB[n−τ+1] following processing-completed data DB[n−τ] is stored in the storage area 14B in step S25.

When processing-completed data DB[n−τ+1] has not been stored in the storage area 14B so that the decision result of step S25 turns to "NO", the acoustic data designation unit 54 designates cross-faded acoustic data DC[n−τ], in which unprocessed data DA[n−τ] is subjected to fade-in (FI) in the ending section σA whilst processing-completed data DB[n−τ] is subjected to fade-out (FO) in the ending section σA, for use in the reproduction processor 44 in step S26.

In the case of FIG. 6, for example, when processing-completed data DB[2] (i.e. DB[n−τ]) is stored in the storage area 14B (i.e. "YES" in step S24) whilst processing-completed data DB[3] (i.e. [n−τ+1]) is not stored in the storage area 14B (i.e. "NO" in step S25), cross-faded acoustic data DC[2] is produced by combining unprocessed data DA[2] and processing-completed data DB[2] in step S26. The acoustic data designation unit 54 designates cross-faded acoustic data DC[n−τ] so as to change its operation mode from the normal mode to the delay mode; thereafter, it exits the process of FIG. 9 in step S27.

When processing-completed data DB[n−τ] and its following processing-completed data DB[nτ+1] are both stored in the storage area 14B in the normal mode so that both the decision results of steps S24, S25 turn to "YES", the acoustic data designation unit 54 proceeds to step S28 (which is similar to step S14 of the first embodiment) so as to designate processing-completed data DB[n−τ] for use in the reproduction processor 44; thereafter, it exits the process of FIG. 9.

When processing-completed data DB[n−τ] is not stored in the storage area 14B in the normal mode (i.e. "NO" in step S24), the acoustic data designation unit 54 proceeds to step S29 (which is similar to step S15 of the first embodiment) so as to designate unprocessed data DA[n−τ], instead of processing-completed data DB[n−τ], for use in the reproduction processor 44. The acoustic data designation unit 54 changes its operation mode from the normal mode to the delay mode in step S30; thereafter, it exits the process of FIG. 9.

In the case of the delay mode (i.e. "NO" in step S23), the acoustic data designation unit 54 proceeds to step S31 (which is similar to step S24 of the first embodiment) so as to make a decision as to whether or not processing-completed data DB[n=r], which corresponds to unprocessed data DA[n=r] that is the reference delay t prior to unprocessed data DA[n] designated by the current processing instruction P, is stored in the storage area 14B.

The delay mode indicates that processing-completed data DB[n−τ−] preceding processing-completed data DB[n−τ] is delayed in communication. Therefore, when processing-completed data DB[n−τ] is stored in the storage area 14B (i.e. "YES" in step S31), the acoustic data designation unit 54 produces and designates cross-faded acoustic data DC[n−τ], in which unprocessed data DA[n−τ] is subjected to fade-out (FO) in the beginning section σB whilst processing-completed data DB[n−τ] is subjected to fade-in (FI) in the beginning section oB, for use in the reproduction processor 44 in step S32.

In the case of FIG. 6, for example, when processing-completed data DB[5] (i.e. DB[n−τ]) is stored in the storage area 14B (i.e. "YES" in step S31) whilst preceding processing-completed data DB[4] is delayed so that the operation mode is set to the delay mode, cross-faded acoustic data DC[5] (i.e. DC[n−τ]) is produced by combining unprocessed data DA[5] and processing-completed data DB[5] in step S32. The acoustic data designation unit 54 designates acoustic data DC[n−τ] for use in the reproduction processor 44 so as to change its operation mode from the delay mode to the normal mode in step S33; thereafter, it exits the process of FIG. 9.

When processing-completed data DB[n−τ] is not stored in the storage area 14B in the delay mode (i.e. "NO" in step S31), the acoustic data designation unit 54 proceeds to step S34 (which is similar to step S15 of the first embodiment) so as to designate unprocessed data DA[n−τ], instead of processing-completed data DB[n−τ], for use in the reproduction processor 44; thereafter, it exits the process of FIG. 9. In this case, the acoustic data designation unit 54 maintains the delay mode. The foregoing steps exemplify the operation of the acoustic data designation unit 54 of the second embodiment.

The second embodiment is able to demonstrate the similar effect as the first embodiment. The second embodiment is able to reliably prevent the listener (or user) from sensing any boundary of acoustics which occurs due to an acoustic transition of reproduced sound from processed sound to original sound since cross-faded acoustic data DC[n] (e.g. DC[2]), combining unprocessed data DA[n] and processing-completed data DB[n], is deliberately inserted and reproduced just before next unprocessed data DA[n+1] (e.g. DA[3]). Additionally, the second embodiment is able to reliably prevent the listener (or user) from sensing any boundary of acoustics which occurs due to an acoustic transition of reproduced sound from original sound to processed sound since cross-faded acoustic data DC[n] (e.g. DC[5]), combining unprocessed data DA[n] and processing-completed data DB[n], is deliberately inserted and reproduced just after preceding unprocessed data DA[n−1] (e.g. DA[4]). Thus, it is possible to reproduce sound with an acoustically natural impression to the listener (or user).

In conclusion, the present invention can be implemented in both the hardware and the software; hence, programs describing the foregoing operations and functions can be stored in any type of storage devices such as CD-ROM and semiconductor memory and executed by any type of information processing devices such as computers. Alternatively, these programs can be transmitted from servers to clients via communication networks.

More specifically, the acoustic data communication device 10 can be embodied using the hardware (or electronic circuitry) such as a DSP (Digital Signal Processor) specifically designed for controlling acoustic data. Alternatively, the acoustic data communication device can be embodied via cooperation between the software (programs) and a general-purpose arithmetic and logic unit such as a CPU (Central Processing Unit). The present invention can be implemented using programs which cause a computer to provide the functionality of the acoustic data communication device, which is essentially constituted of a first storage that stores a time series of unprocessed data representing original acoustic data prior to acoustic processing; a transmitter that sequentially transmits the time series of unprocessed data to the acoustic data processing device; a receiver that sequentially receives a time series of processing-completed data from the acoustic data processing device in correspondence with the time series of unprocessed data which are subjected to acoustic processing; a second storage that stores the time series of processing-completed data received by the receiver; an acoustic data designation unit that sequentially designates the time series of processing-completed data stored in the second storage, wherein when specific processing-completed data is not stored in the second storage at the timing of designating the specific processing-completed data, the acoustic data designation unit designates specific unprocessed data stored in the first storage, which is unprocessed acoustic data corresponding to the specific processing-completed data, instead of the specific processing-completed data; and a reproduction processor that sequentially reproduces acoustic data designated by the acoustic data designation unit.

In this connection, programs involving the present invention are stored in computer-readable storage media, which are distributed to users and installed in their computers. Alternatively, a specific server is used to distribute programs to clients (or users) via a communication network, so that programs are downloaded and installed in computers.

Lastly, the present invention is not necessarily limited to the foregoing embodiments, which can be further modified within the scope of the present invention as defined in the appended claims.

What is claimed is:

1. An acoustic data communication device comprising:
a first storage area that stores a time series of unprocessed data representing original acoustic data prior to acoustic processing by an acoustic data processing device;
a communication device that:
sequentially transmits the unprocessed data stored in the first storage area to the acoustic data processing device; and
sequentially receives a processing-completed data generated by the acoustic data processing device, which processes the transmitted unprocessed data;
a second storage area that sequentially stores a time series of processing-completed data received from the acoustic data processing device;
a processor configured to execute:
an acoustic data designation task that sequentially designates the time series of processing-completed data corresponding to the time series of unprocessed data stored in the first storage area,
wherein when a specific processing-completed data is not stored in the second storage area at the timing of designating the specific processing-completed data, the acoustic data designation task designates a specific unprocessed data stored in the first storage area instead of the specific processing-completed data,
a reproduction task that sequentially reproduces acoustic data designated by the acoustic data designation task; and
an instruction generating task that sequentially generates processing instructions to store the unprocessed data in the first storage area and sequentially transmit the stored unprocessed data to the acoustic data processing device to allow the acoustic data designation task to designate the processing-completed data corresponding to the unprocessed data by each processing instruction,
wherein the acoustic data designating task designates the specific unprocessed data after a predetermined period has lapsed after the communication device has transmitted the unprocessed data to the acoustic data processing device, and wherein the predetermined period is determined based on an average time elapsed between the timing of transmitting the unprocessed data to the acoustic processing device and the timing of receiving the processing-completed data representing the result of processing of the unprocessed data.

2. The acoustic data communication device according to claim 1, wherein, when, at the timing of designating processing-completed data, the designated processing-completed data is stored in the second storage area while a next processing-completed data following the designated processing-completed data is not stored in the second storage area, the acoustic data designation task produces and designates cross-faded acoustic data, where the designated processing-completed data sequentially decreases in level the unprocessed data corresponding to the designated processing-completed data sequentially increases in level, for use by the reproduction task.

3. The acoustic data communication device according to claim 1, wherein when, at the timing of designating processing-completed data, the designated processing-completed data is stored in the second storage area while preceding processing-completed data preceding the designated processing-completed data is not stored in the second storage area, the acoustic data designation task produces and designates cross-faded acoustic data, where the designated processing-completed data sequentially increases in level while the unprocessed data corresponding to the designated processing-completed data sequentially decreases in level, for use by the reproduction-task.

4. An acoustic data communication method of communicating between an acoustic data communication device, which has a first storage area, a second storage area, a communication device, and a processor, and an acoustic data processing device, the method being executable by the processor and comprising the steps of:
    storing, in the first storage area, a time series of unprocessed data representing original acoustic data prior to acoustic processing by the acoustic data processing device;
    sequentially transmitting, with the communication device, the unprocessed data stored in the first storage area to the acoustic data processing device;
    sequentially receiving, with the communication device, processing-completed data generated by and received from the acoustic data processing device, which processes the transmitted unprocessed data;
    sequentially storing, in the second storage area, a time series of processing-completed data received from the acoustic data processing device;
    sequentially designating the times series of processing-completed data corresponding to the time series of unprocessed data stored in the first storage area,
    wherein, when a specific processing-completed data is not stored in the second storage area at the timing of designating the specific processing-completed data, the sequentially designating step designates a specific unprocessed data stored in the first storage area instead of the specific processing-completed data;
    sequentially reproducing acoustic data designated in the designating step; and
    sequentially generating processing instructions to store the unprocessed data in the first storage area and sequentially transmit the stored unprocessed data to the acoustic data processing device to allow the sequentially designating step to designate the processing-completed data corresponding to the unprocessed data by each processing instruction,
    wherein the sequentially designating step designates the specific unprocessed data after a predetermined period has lapsed after the communication device has transmitted the unprocessed data to the acoustic data processing device, and
    wherein the predetermined period is determined based on an average time elapsed between the timing of transmitting the unprocessed data to the acoustic processing device and the timing of receiving the processing-completed data representing the result of processing of the unprocessed data.

5. The method according to claim 4, wherein the sequentially designating step designates, when a complete specific processing-completed data is not stored in the second storage area at the timing of designating the specific processing-completed data, cross-faded acoustic data that combines both the unprocessed data and part of the processing-completed data that has been processed instead of the specific processing-completed data.

6. A non-transitory computer-readable storage medium storing a program to execute an acoustic data communication method of communicating between an acoustic data communication device, which has a first storage area, a second storage area, a communication device, and a processor, and an acoustic data processing device, the program being executable by the processor to execute the method comprising the steps of:
    storing, in the first storage area, a time series of unprocessed data representing original acoustic data prior to acoustic processing by the acoustic data processing device;
    sequentially transmitting, with the communication device, the unprocessed data stored in the first storage area to the acoustic data processing device;
    sequentially receiving, with the communication device, processing-completed data generated by and received from the acoustic data processing device, which processes the transmitted unprocessed data;
    sequentially storing, in the second storage area, a time series of processing-completed data received from the acoustic data processing device;
    sequentially designating the times series of processing-completed data corresponding to the time series of unprocessed data stored in the first storage area,
    wherein, when a specific processing-completed data is not stored in the second storage area at the timing of designating the specific processing-completed data, the sequentially designating step designates a specific unprocessed data stored in the first storage area instead of the specific processing-completed data;
    sequentially reproducing acoustic data designated in the designating step; and
    sequentially generating processing instructions to store the unprocessed data in the first storage area and sequentially transmit the stored unprocessed data to the acoustic data processing device to allow the sequentially designating step to designate the processing-completed data corresponding to the unprocessed data by each processing instruction,
    wherein the sequentially designating step designates the specific unprocessed data after a predetermined period has lapsed after the communication device has transmitted the unprocessed data to the acoustic data processing device, and wherein the predetermined period is determined based on an average time elapsed between the timing of transmitting the unprocessed data to the acoustic processing device and the timing of receiving the processing-completed data representing the result of processing of the unprocessed data.

7. The non-transitory computer-readable storage medium according to claim 6, wherein the sequentially designating step designates, when a complete specific processing-completed data is not stored in the second storage area at the timing of designating the specific processing-completed data, cross-faded acoustic data that combines both the unprocessed data and part of the processing-completed data that has been processed instead of the specific processing-completed data.

* * * * *